(12) United States Patent
Chakrapani et al.

(10) Patent No.: US 7,847,033 B2
(45) Date of Patent: Dec. 7, 2010

(54) MATERIALS AND METHODS FOR IMPROVING PROPERTIES OF SPD EMULSIONS AND FILMS

(75) Inventors: Srinivasan Chakrapani, Bridgewater, NJ (US); Robert L. Saxe, New York, NY (US); Steven M. Slovak, Massapequa, NY (US)

(73) Assignee: Research Frontiers Incorporated, Woodbury, NY (US)

( * ) Notice: Subject to any disclaimer, the term of this patent is extended or adjusted under 35 U.S.C. 154(b) by 1133 days.

(21) Appl. No.: 11/471,321

(22) Filed: Jun. 20, 2006

(65) Prior Publication Data

US 2007/0006968 A1    Jan. 11, 2007

Related U.S. Application Data

(60) Provisional application No. 60/697,419, filed on Jul. 8, 2005.

(51) Int. Cl.
*C09K 19/02* (2006.01)
*C08F 283/12* (2006.01)

(52) U.S. Cl. ..................... 525/479; 428/1.23

(58) Field of Classification Search ................ 526/279; 525/479

See application file for complete search history.

(56) References Cited

U.S. PATENT DOCUMENTS

| 4,605,712 | A | | 8/1986 | Mueller ................. 525/474 |
| 5,279,773 | A | * | 1/1994 | Saxe ..................... 252/585 |
| 5,463,491 | A | * | 10/1995 | Check, III ................ 359/296 |
| 5,463,492 | A | * | 10/1995 | Check, III ................ 359/296 |
| 5,593,615 | A | * | 1/1997 | Nerad et al. ............ 252/299.01 |
| 6,296,920 | B1 | | 10/2001 | Buehler ..................... 429/98 |
| 6,333,383 | B1 | | 12/2001 | Ohnishi ..................... 525/92 |
| 6,416,827 | B1 | * | 7/2002 | Chakrapani et al. ......... 428/1.31 |
| 6,858,164 | B2 | * | 2/2005 | Yanagisawa ............... 252/583 |
| 6,900,923 | B2 | | 5/2005 | Chakrapani et al. ......... 359/296 |
| 7,312,916 | B2 | * | 12/2007 | Pullen et al. ............... 359/296 |
| 2004/0115436 | A1 | * | 6/2004 | Komiya et al. ............ 428/411.1 |
| 2004/0257634 | A1 | * | 12/2004 | Chakrapani et al. ......... 359/296 |

FOREIGN PATENT DOCUMENTS

| EP | 0 908 758 | 4/1999 |
| EP | 1 337 891 | 8/2003 |
| WO | WO 02/35281 | 5/2002 |
| WO | WO 2004/092807 | 10/2004 |

OTHER PUBLICATIONS

International Search Report dated Jan. 18, 2008.
Search Report dated Sep. 25, 2008 in corresponding European Patent Application No. 06773658.7.

* cited by examiner

*Primary Examiner*—Randy Gulakowski
*Assistant Examiner*—Mike Dollinger
(74) *Attorney, Agent, or Firm*—Ostrolenk Faber LLP

(57) ABSTRACT

An emulsifier for use in forming a film for a suspended particle device (SPD) wherein the film is comprised of a cross-linked matrix polymer having a plurality of droplets of a liquid light valve suspension distributed therein. The emulsifier is formed of a copolymer material comprising at least first and second segments, the segments differing from one another in at least one of their chemical affinities, their compositions and their polarities. A first one of the segments is soluble in an uncured liquid matrix polymer used in forming the film, but insoluble in a liquid suspension medium of which the droplets are dispersed. A second segment is soluble in the liquid suspending medium in the droplets and insoluble in the uncured liquid matrix polymer. The first and second segments have substantially the same index of refraction and the index of refraction of the segments is within 0.010 of that of each phase of an emulsion formed with the emulsifier.

16 Claims, No Drawings

MATERIALS AND METHODS FOR IMPROVING PROPERTIES OF SPD EMULSIONS AND FILMS

CROSS REFERENCE TO RELATED APPLICATION

This application claims priority of Provisional Application No. 60/697,419 filed Jul. 8, 2005, the contents of which are specifically incorporated by reference herein.

FIELD OF THE INVENTION

The present invention relates generally to suspended particle device (SPD) light valves, and to emulsions and films made from such emulsions for use in such SPD light valves. In particular, the present invention relates to (1) emulsifiers which, when added to an SPD emulsion, serve to improve the stability of the emulsion and/or the performance characteristics of SPD film made therefrom, as well as to (2) methods of improving the stability of an SPD emulsion and/or the performance characteristics of SPD film made therefrom through the use of an emulsifier according to the invention in forming the emulsions used in making such films.

BACKGROUND OF THE INVENTION

Light valves have been known for over seventy years for the modulation of light and are thus well known in the art. As used herein, a "light valve" is defined as a cell formed of two walls that are spaced apart by a small distance, at least one wall being transparent, the walls having electrodes thereon usually in the form of transparent electrically conductive coatings. The cell contains a light-modulating element, which may be either a liquid suspension of particles or preferably a plastic film in which droplets of a liquid suspension of particles are distributed.

The liquid suspension (sometimes herein referred to as "a liquid light valve suspension" or simply a "light valve suspension") comprises small particles suspended in a liquid suspending medium. In the absence of an applied electrical field, the particles in the liquid suspension assume random positions due to Brownian movement. Hence, a beam of light passing into the cell is reflected, transmitted or absorbed, depending upon the cell structure, the nature and concentration of the particles and the energy content of the light. The light valve is thus usually relatively dark in the OFF state. However, when an electric field is applied through the liquid light valve suspension in the light valve, the particles become aligned and for many suspensions most of the light can pass through the cell. The light valve is thus relatively transparent in the ON state. Light valves of the type described herein are also known as "suspended particle devices," or "SPDs."

Light valves have been proposed for use in numerous applications including, without limitation, e.g., alpha-numeric and television displays, windows, sun-roofs, sun-visors, filters, toys, apparel, mirrors, eyeglasses and the like to control the amount of light passing therethrough or reflected therefrom, as the case may be.

For many applications, as would be well understood in the art, it is preferable for the material which is to be activated, i.e., the light modulating element, or "the activatable material", to be a plastic film rather than a liquid suspension. For example, in a light valve used as a variable light transmission window, a plastic film, in which droplets of liquid suspension are distributed, is preferable to a liquid suspension alone because hydrostatic pressure effects, e.g., bulging associated with a high column of liquid suspension can be avoided through use of a film, and the risk of possible leakage can also be avoided. Another advantage of using a plastic film is that, in a plastic film the particles are generally present only within very small droplets and, hence, do not noticeably agglomerate when the film is repeatedly activated with a voltage. The term, "light valve film" as used herein refers to a film having droplets of a liquid suspension of particles distributed in the film.

U.S. Pat. No. 5,409,734 exemplifies a type of light valve film that is made by phase separation from a homogeneous solution. Light valve films made by cross-linking emulsions are also known. See U.S. Pat. Nos. 5,463,491 and 5,463,492, both of which are assigned to the assignee of the present invention and incorporated by reference into this specification.

The following is a brief description, for purposes of illustrating the invention, of the components of a representative light valve suspension.

1. Liquid Suspending Media and Stabilizers

A liquid light valve suspension for use in the present invention may be any liquid light valve suspension known in the art and may be formulated according to techniques well known to one skilled in the art. The term "liquid light valve suspension" means, as noted above, a "liquid suspending medium" in which a plurality of small particles are dispersed. The "liquid suspending medium" comprises one or more non-aqueous, electrically resistive liquids in which there is preferably dissolved at least one type of polymeric stabilizer which acts to reduce the tendency of the particles to agglomerate and to keep them dispersed and in suspension.

The liquid light valve suspensions useful in the present invention may include any of the liquid suspending media previously proposed for use in light valves for suspending the particles. Liquid suspending media known in the art which are useful in the invention, include, but are not limited to, the liquid suspending media disclosed in U.S. Pat. Nos. 4,247,175 and 4,407,565, which are also incorporated by reference herein. In general, one or both of the liquid suspending medium or the polymeric stabilizer dissolved therein is chosen so as to maintain the suspended particles in gravitational equilibrium.

The polymeric stabilizer, when employed, can be a single type of solid polymer that bonds to the surface of the particles but which also dissolves in one or more of the non-aqueous liquid or liquids of the liquid suspending medium. Alternatively, two or more solid polymeric stabilizers may serve as a polymeric stabilizer system. For example, the particles can be coated with a first type of solid polymeric stabilizer such as nitrocellulose which, in effect, provides a plain surface coating for the particles. The coated particles are thereafter re-coated with one or more additional types of solid polymeric stabilizer that bond to or associate with the first type of solid polymeric stabilizer and which also dissolves in the liquid suspending medium to provide dispersion and steric protection for the particles. Liquid polymeric stabilizers may also be used to advantage, especially in SPD light valve films, as described in U.S. Pat. No. 5,463,492 mentioned above.

The polymeric stabilizers described in the three paragraphs above are confined to the liquid suspensions and serve to reduce the tendency of the particles to agglomerate and to keep the particles dispersed and in suspension. These polymeric stabilizers should not be confused with the emulsifiers of the present invention, however, which are polymeric stabilizers of a different kind having an entirely different purpose, as disclosed and discussed hereinafter.

2. Particles

Inorganic and organic particles may be used in a light valve suspension, and such particles may be either light-absorbing or light-reflecting.

Although many types of particles can be used with the present invention, because of the great body of prior art knowledge relating to use of polyhalide particles in SPD liquid suspensions, SPD light valves have usually employed anisometric polyhalide particles of colloidal size. The term "colloidal" as used herein means that the particles generally have a largest dimension averaging about 1 micron or less. Preferably, the largest dimension of most of the particles used in a light valve suspension should be less than one-half of the wavelength of blue light, i.e., 2000 Angstroms or less, to keep light scatter extremely low. As used herein, the term "anisometric," which refers to particle shape, means that at least one dimension of a particle is larger than another dimension, e.g., the particle length is greater than its width or its diameter as the case may be.

As mentioned above, it is preferable to use a plastic film as the activatable material, i.e., the light modulating unit of an SPD light valve. In the preferred type of SPD film, very small size droplets of liquid suspension are distributed throughout a cross-linked polymer matrix. Such a film is produced from an emulsion comprising (1) a cross-linkable liquid matrix polymer; (2) droplets of liquid suspension which are immiscible with the cross-linkable liquid matrix polymer; and (3) an effective amount of a photoinitiator. Cross-linking (i.e., curing) the emulsion can be accomplished by a variety of means depending on the matrix polymer, e.g., by subjecting the emulsion to heat, or to electron beam radiation or ultraviolet radiation. If heat curing is employed, a catalyst would be used instead of a photoinitiator. In order to avoid confusion and enhance understanding of the present invention, the invention is discussed hereinafter only in terms of cross-linking the emulsion by subjecting it to ultraviolet radiation, with the understanding that, as indicated above a variety of additional cross-linking techniques are available for use.

Advanced types of SPD emulsions and SPD films and methods of making them are disclosed in U.S. Pat. No. 6,900,923 B2 (Chakrapani et al.), which is incorporated by reference in this specification in its entirety. The Chakrapani et al. patent discloses SPD films made from an emulsion comprising (1) a matrix polymer comprising poly(diphenyl dimethyl siloxane) and a cross-linkable monomer such as 3-acryloxypropylmethyl dimethoxy silane; (2) a liquid suspension comprised of polyiodide particles coated with nitrocellulose polymer and dispersed in a polymeric liquid such as poly (lauryl methacrylate); and (3) a photoinitiator such as IRGACURE® 819 (bis(2,4,6-trimethylbenzoyl)-phenyphosphineoxide) (available from CIBA Specialty Chemicals). When the matrix is cross-linked by subjecting a layer of the emulsion to ultraviolet radiation, an SPD film is formed. Certain other non-polymeric liquids disclosed in the Chakrapani et al. patent may optionally be used as part of the liquid suspension. Methods of producing colloidal polyiodide particles coated with nitrocellulose polymer, which can be dispersed in any suitable liquid suspending medium, such as but not limited to a liquid ester such as poly(lauryl methacrylate), are well known in the prior art. Without limitation thereto, see U.S. Pat. No. 5,516,463 entitled "Method of Making Light-Polarizing Particles" assigned to the assignee of the present invention and incorporated herein by reference.

Heretofore, it has not been found necessary to employ a separate emulsifier in order to make a reasonably stable SPD emulsion provided that one cured the well-mixed emulsion quickly after coating the emulsion on a substrate. However, for reasons disclosed herein, an emulsifier, which is a material, preferably a liquid (but sometimes a gel or a solid), can be advantageously used in an SPD emulsion. A first part or segment of the emulsifier is usually soluble in one phase of an emulsion but insoluble in the second phase of the emulsion, and a second part or segment of the emulsifier usually has the opposite solubility characteristics of said first part of said material. Because of these solubility properties, an emulsifier helps to make the two immiscible phases of an emulsion more compatible with one another, which has the effect of stabilizing the emulsion. As is disclosed in more detail hereinafter, however, a material may serve satisfactorily as an emulsifier even if its solubility is somewhat different than described in this paragraph, provided that its segments have appropriate characteristics in accordance with those of the emulsifiers of the invention.

The inventors have observed that if one does not coat and cure a well mixed relatively low viscosity emulsion quickly enough, there is a tendency for the droplets of an uncured SPD emulsion over time to coalesce so as to form larger diameter droplets. Although coalescence of droplets can occur at higher viscosities, such coalescence occurs more rapidly if the viscosity of the emulsion is relatively low, e.g., 5,000 centipoises or less at 25° C. The viscosity of an emulsion can be affected by raising or lowering the molecular weight of one or more of the polymers used in the emulsion. Moreover, for the purpose of coating film in mass production it may sometimes be desirable to lower the viscosity of the uncured emulsion being coated on a substrate on a moving web, for example, by heating the emulsion, which would lower its viscosity and thereby speed up the process of droplet coalescence. Also, the process of mass producing SPD film on a moving web may itself consume a significant amount of time which could give droplets more time to grow by coalescing before curing occurs. Rapid coalescence of droplets occurs if the second transparent electrically conductive-coated substrate is applied to the uncured emulsion coated on the opposing transparent conductive-coated substrate prior to being cured.

The inventors have also noticed that, in general, otherwise identical SPD films comprising relatively small average sized droplets, e.g., 1-2.5 micron diameter droplets, have superior performance properties compared to SPD films comprising larger average sized droplets, e.g., 12.5 microns in diameter or greater, when activated with the same voltage and frequency. Specifically, films comprising the relatively small average sized droplets exhibit a significantly lower (darker) off-state transmission, greater light transmission range and lower on-state haze than the films comprising relatively larger average sized droplets.

Accordingly, it would be highly desirable to have an emulsifier which would retard the coalescence of the droplets, even at elevated temperatures.

In U.S. Pat. No. 5,463,492, assigned to the assignee of the present invention, an SPD liquid matrix polymer and its method of synthesis is disclosed, wherein the polymer comprises (1) a main chain that is insoluble in the liquid suspending medium of the droplets and (2) pendant polymeric groups that are soluble in the liquid suspending medium. Because of its structure, the liquid matrix polymer is referred to in Column 10 of U.S. Pat. No. 5,463,492 as a "cross-linkable copolymer emulsifier." Lines 11-12 of Column 10 state, as one of its claimed advantages, "Thus, the cross-linkable copolymer emulsifier does not require the use of a separate emulsifier."

It has been found by the inventors, however, that the cross-linkable copolymer emulsifier also has several serious disadvantages. It is very difficult and expensive to synthesize or obtain. Also its shelf life is poor. If the copolymer degrades it may become unusable. Moreover, it limits one's flexibility in formulating how much emulsifier to use, a problem that can be avoided if instead, a separate non-crosslinkable emulsifier were used to stabilize an emulsion.

There has thus been a long felt need for a suitable separate emulsifier capable of stabilizing emulsions of the type described in U.S. Pat. No. 6,900,923 B2 mentioned above. This need is well met by the emulsifiers according to the present invention without incurring the attendant disadvantages of the prior art emulsifiers discussed above.

SUMMARY OF THE INVENTION

In one embodiment, the invention is directed to a separate and improved emulsifier for forming a film adapted for use in a suspended particle device, which film is comprised of a cross-linked matrix polymer having a plurality of droplets of a liquid light valve suspension distributed therein. The emulsifier is formed of a copolymer material comprising at least a first and a second segment, wherein the segments differ from one another in at least one of their chemical affinities, their compositions and their polarities. A first one of the segments is soluble in an uncured liquid matrix polymer used in forming the film, but insoluble in a liquid suspension medium in which the droplets are dispersed. A second one of the segments is soluble in the liquid suspending medium of the droplets and insoluble in the uncured liquid matrix polymer. The first and second segments have substantially the same index of refraction, wherein the index of refraction of the segments is within 0.010 of that of each phase of an emulsion formed with the emulsifier of the invention. In one embodiment, the first segment is comprised of a material selected from the group consisting of linear organosiloxanes, branched organosiloxanes, linear alkyl groups, branched alkyl groups, linear fluoroalkyl groups and branched fluoroalkyl groups. The second segment, in turn, is comprised of a material selected from the group consisting of linear esters, branched esters, linear (meth)acrylate, branched (meth)acrylate, linear amide, branched amide, linear amine, branched amine, linear epoxy groups, branched epoxy groups, linear groups comprising hydroxyl or acid groups and branched groups comprising hydroxyl or acid groups. The emulsifier is adapted to substantially prevent coalescence of the droplets of the liquid light valve suspension during formation of the film by retarding the growth of the droplets.

In another embodiment, the invention is directed to an emulsifier for use in forming a film adapted for inclusion in a suspended particle device, wherein the emulsifier is represented by Formula I below:

where R represents an initiator moiety,

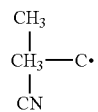

and $R^1$ represents an alkyl(meth)acrylate polymeric segment, and wherein

represents a phenyl group

In a further embodiment, the invention is directed to a method of improving the stability of an emulsion used in forming a film adapted for use in a suspended particle device, which comprises forming the film with the use of an emulsifier according to the invention as described above.

In another embodiment, the invention is directed to a method of reducing coalescence of drops of a liquid suspension medium in an emulsion used in forming a film adapted for use in a suspended particle device, which comprises forming the film with the use of an emulsifier according to the invention as described above.

In still another embodiment, the invention is directed to a method for improving the performance characteristics of a film adapted for use in a suspended particle device, which comprises forming the film with an emulsifier according to the invention as described above.

DETAILED DESCRIPTION OF THE INVENTION

The invention therefore comprises an improved emulsifier for use in forming cross-linked films used in SPD devices such as light valves. The emulsifier of the invention comprises first and second segments differing from one another in at least one of their chemical affinities, their compositions and their polarities. The first segment is soluble in the uncured liquid matrix polymer portion of the film-forming material, while remaining insoluble in the liquid suspending medium of the droplets. The second segment is soluble in the liquid suspending medium of the droplets but insoluble in the liquid matrix polymer. In the embodiment herein described, the first segment is comprised of a material selected from the group consisting of linear organosiloxanes, branched organosiloxanes, linear alkyl groups, branched alkyl groups, linear fluo-

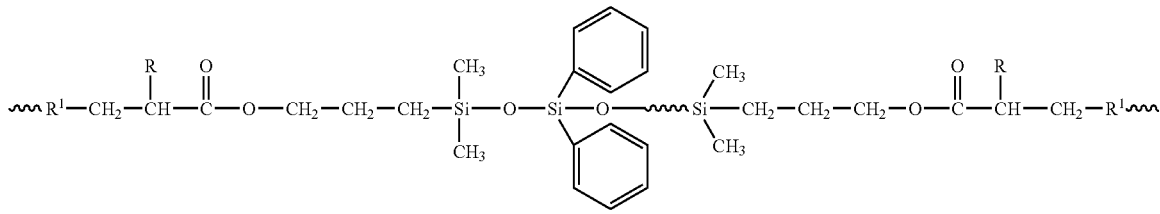

roalkyl groups and branched fluoroalkyl groups, wherein the second segment is comprised of a material selected from the group consisting of linear esters, branched esters, linear (meth)acrylate, branched (meth)acrylate, linear amide, branched amide, linear amine, branched amine, linear epoxy groups, branched epoxy groups, linear groups comprising hydroxyl or acid groups and branched groups comprising hydroxyl or acid groups.

In one embodiment, notwithstanding the solubilities of its segments, the emulsifier taken as a whole is substantially soluble in the liquid matrix polymer and substantially insoluble in the liquid suspension medium when it is mixed separately with both liquids. In another embodiment, the emulsifier taken as a whole is substantially soluble in the liquid suspension medium and substantially insoluble in the liquid matrix polymer when mixed separately with both liquids. In alternate embodiments, the emulsifier as a whole may be soluble or insoluble, respectively, in both phases of the emulsion when tested with each phase separately, while serving as an effective emulsifier when both phases of the emulsion are combined.

Furthermore, in order to avoid increasing haze within the resultant emulsion, it is additionally required in emulsifiers according to the invention that the two segments should have substantially the same index of refraction, which would also be substantially the same as the index of refraction of both the matrix polymer and liquid suspending medium. The emulsifier should have an index of refraction within 0.010 of each phase of the emulsion, preferably within 0.005 of one another, and more preferably within 0.002 of one another.

Any emulsifier, having been formed from the indicated materials, which meets the solubility and refractive index requirements described above would fall within the scope of the invention. Specific, non-limiting examples of emulsifiers formed according to the invention are presented hereinafter. In general, by suitably adjusting the molecular weight and/or the composition of each segment of the copolymer, in a manner which would be well understood by one of ordinary skill in the art, it is possible to achieve any of the aforesaid emulsifier solubility characteristics.

In a particular embodiment, the emulsifier of the invention would be the primary product of the synthesis described in Example 1 of the specification as given below.

of a polyorganosilaxane polymer with pendent phenyl groups so as to provide a refractive index at 25° C. in the range of 1.4630 to 1.4800. Also, the weight percent composition of the polyorganosiloxane in the emulsifier copolymer could be in the range of 35% to 65% by weight. The molecular weight of the siloxane segment may be, for example in the range of 10,000 Daltons. Similarly the (meth)acrylate segment(s) of the emulsifier could consist of $C_6$ or higher alkyl (meth) acrylates that are soluble in poly(lauryl methacrylate) having a molecular weight of 1500-6000 Daltons and of appropriate refractive index (RI) that would provide/confer the final emulsifier molecule with a RI of 1.4730±0.005 as one non-limiting example. The weight percent composition of the (meth)acrylate segment in the overall emulsifier could lie in the range of 35-65%. The (meth)acrylate segment could be a homopolymer of $C_6$ or higher alkyl(meth)acrylates or a copolymer with 2-hydroxyethylmethacrylate, and the polymer and alkyl groups of this segment may be either linear or branched, where possible.

EXAMPLES

The following Examples are provided only for the purpose of illustration and are not to be construed as limiting the invention in any manner.

In Example 1 there is described a method for synthesizing a copolymer emulsifier in accordance with the present inven-

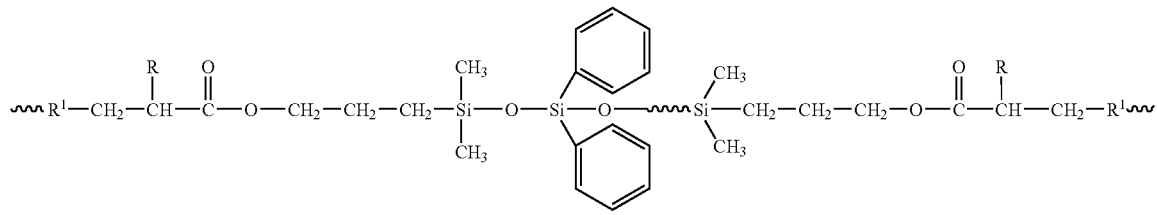

where R represents an initiator moiety,

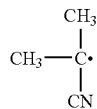

and $R^1$ represents alkyl(meth)acrylate polymeric segments such as (lauryl methacrylate-co-HEMA) polymer, and wherein

represents a phenyl group.

As described in Example 1, other structures or mixtures of structures comprising a minority of the reaction products are also possible.

In order to satisfy the demands of solubility with the matrix polymer of the present invention, in one embodiment of the invention one segment of the emulsifier copolymer consists tion The Example further describes how the emulsifier was incorporated into an emulsion and the type of measurements that were taken.

Example 1

Synthesis and Evaluation of Diphenyldimethyl Siloxane-co-Laurylmethacrylate/2-hydroxyethylmethacrylate Polymers as Emulsifiers for an SPD Emulsion System In order to enhance the stability of SPD emulsions based on diphenyldimethyl siloxanes and laurylmethacrylate ("LMA")/2-hydroxyethylmethacrylate ("HEMA" or "2-HEMA") random copolymers, a copolymer was synthesized in a two-step process which would yield a siloxane segment having pendant phenyl groups and a LMA/HEMA random copolymer-containing segment.

General Procedure for Synthesis of the Copolymer Emulsifier

The first step in the synthesis of the emulsifier involves preparing the siloxane segment of the emulsifier which comprises a disilanol-terminated diphenyl (14-18% by weight) dimethyl (86-82% by weight) siloxane (the major component in the matrix polymer synthesis) and reacting it with 3-acryloxypropyldimethylmethoxysilane. The siloxane segment of the emulsifier is similar to the siloxane segment of the matrix polymer of the aforesaid Chakrapani et al. Patent except for omitting the 3-acryloxypropylmethyldimethoxysilane normally used as a cross-linking material in the matrix polymer. In its place in the emulsifier a new component for this segment is used, namely 3-acryloxypropyldimethylmethoxysilane, which is used to terminate the siloxane chains. This reaction provides siloxane chains to which a reactive (meth)acrylate functionality can usually be attached at each end of the chain, which reaction will be carried out in a second polymerization step to attach LMA/HEMA random copolymer to the siloxane chains. The resulting copolymer configuration could be (1) a block-type polymer having three linear blocks, i.e., having an A-B-A structure; or (2) a linear A-B block polymer if one end of the siloxane chain is end capped so that only one end of that chain is reactable; or (3) a "ladder" polymer having a siloxane chain attached to and bridging two LMA/HEMA chains; or (4) small amounts of poly(LMA/HEMA) and/or poly(organosiloxane) copolymer or homopolymer as the case may be if the chains are end capped (terminated) before reacting with their intended other active segment; or (5) a mixture of two or more of said polymers or copolymers. The emulsifiers thus synthesized were purified by passing them through a short path distillation unit at 80-100° C. at 2 mTorr to remove volatile impurities which, if not removed, could contaminate the emulsion and any SPD film made from it. Additional steps known in the art to further remove impurities from the emulsion may also be optionally employed.

The resulting copolymers were used in several wt. % concentrations (based on the weight of the SPD emulsion) in the SPD emulsion. The SPD emulsion was stirred and coated on indium tin oxide ("ITO")-coated polyethylene terephalate ("PET") plastic substrates and the growth of the droplets in size on these substrates with respect to time at different temperatures measured using a microscope. This type of substrate is conventionally used in pairs with an activatable material sandwiched between the substrates to form a light valve.

Specific Procedure for Synthesis of the Copolymer Emulsifier

The procedure for the synthesis of an emulsifier is exemplified below by providing a description of some of the experiments. Other emulsifiers were synthesized using a similar procedure, but incorporating conditions that changed the molecular weight of one or both segments of the emulsifier.

Step 1

Synthesis of the Siloxane Segment

Into a three-neck, 500 mL round bottom flask the following materials were charged:

50 g of purified disilanol terminated diphenylsiloxane-dimethylsiloxane and 200 mL of heptane. One port was used for mechanical mixing, the second port was used for setting up the Dean-Stark condensation assembly and the last port was used as the sampling port. The reaction mixture was refluxed for 30 minutes. At the end of 30 minutes, 0.04 g of stannous (II) octoate catalyst and 2 g of 3-acryloxypropyldimethylmethoxysilane ("3-Ac") were introduced and the reflux continued for 90 minutes. At the end of 90 minutes, the temperature was reduced to 80° C. and 15 mL of trimethylmethoxysilane was introduced to cap chain ends that were not endcapped by 3-Ac. The endcapping reaction was done for 60 minutes. At the end of this reaction, the reaction mixture was poured into 250 mL of ethanol in a 1 L beaker and stirred. The reaction flask was rinsed with 50 mL of heptane and the liquid was added to the 1 L beaker. To this stirred mixture was added 250 mL of methanol and the stirring continued for an additional 10 minutes. The contents of the beaker were then transferred into a 1 L separatory funnel for layer separation. After allowing to stand for about 12 hours, the bottom layer was separated and rotary evaporated to obtain the siloxane segment of the emulsifier for methacrylate segment incorporation.

The yield, after rotary evaporation was 39.4 g and the obtained polymer had a refractive index of 1.4734. The number average molecular weight, Mn, of the polymer was 20,500 Daltons.

Step 2

Synthesis of the Copolymer Emulsifier

Into a 250 mL, 3-neck flask the following materials were charged: 11.5 g of the siloxane segment (as prepared above in Step 1), 16.06 g of laurylmethacrylate (LMA), 0.35 g of 2-HEMA and 0.3 g of 1-hexanethiol. Then, to this mixture was added 20 mL of degassed (by nitrogen bubbling) toluene. An appropriate sized magnetic stirring bar was used for stirring the reaction mixture during the entire reaction period. One port of the flask was used for condensing the refluxing solvent, the second port was used for introducing a thermometer for monitoring the reaction temperature and the third port was used for sampling.

Nitrogen was bubbled during the entire course of the reaction. The reaction mixture was heated to 75° C. at which point 0.05 g of 2,2'-azobisisobutyronitrile ("AIBN") initiator in 10 mL of toluene was introduced. The temperature of the reaction was maintained at 80° C. for 20 hours. Then the reaction mixture was refluxed for an additional 2 hours to decompose any unreacted AIBN free radical initiator. The reaction mixture was rotary evaporated to obtain the copolymer. The rotary evaporated copolymer was passed through a short path distillation (spd) unit at 100° C. at 2 mTorr pressure. Yield after spd treatment was 22.9 g. The refractive index of the copolymer was 1.4695. The molecular weight at peak maximum, Mp, of the methacrylate segment of the copolymer was 7500. The copolymer had an iridescent color.

Step 3

Evaluation of the Copolymer as an Emulsifier for SPD Emulsion System

Two emulsion formulations of identical composition were made from the same emulsion components but with one containing the emulsifier and the second without the emulsifier (serving as the control). The emulsifier was incorporated in a concentration of 2 wt. % of the emulsion. The vials containing the emulsion were placed in an oven at 65° C. for 10 minutes for the emulsion to equilibrate to that temperature. Then, the emulsions were quickly stirred and spread out on ITO-coated PET substrates as 2 mil wet coatings. The droplet sizes (diameters) of the coatings on the substrates were quickly measured under a microscope and the substrate returned back to the oven for extended heating periods as mentioned in Table 2. Every time the substrate was taken out of the oven, droplet sizes were quickly measured and the substrate quickly returned back to the oven. In Table 2 the average droplet sizes of droplets of uncured emulsion comprising 0 and 2 wt. % emulsifier respectively were microscopically measured at "zero time," i.e., just after mixing the emulsion, and also after 2, 5 and 30 minutes.

The table indicates that due to a slower rate of coalescence droplets having an initial average size of 1-2.5 microns after 2, 5 and 30 minutes grew much less in size if 2 wt. % of emulsifier was used than if no emulsifier is used. In Table 3 below separate data are given for SPD films cured after the times shown. In general, for a given time before curing, the average droplet size decreases as the amount of emulsifier increases. Also, the light transmission range (ΔT) increases as the average droplet decreases, i.e., as the amount of emulsifier increases. In addition, it has been found that the desirable amount of emulsifier increases as the average droplet size decreases, which we think is related to the fact that, for a given weight of emulsion, the surface area of droplets made therefrom increases inversely with average droplet diameter. Hence, if average droplet size were only 1 micron in diameter when an emulsion is cured, the desired amount of emulsifier could be as large as 4 wt. % of the emulsion. The emulsifier concentration of the present invention, for any embodiment, is not limited to 4 wt. %.

Example 2

Step 1

Synthesis of the Siloxane Segment

Into a three-neck, 500 mL round bottom flask the following materials were charged:

50 g of purified disilanol terminated diphenylsiloxane-dimethylsiloxane and 200 ml of heptane. One port was used for mechanical mixing, the second port was used for setting up the Dean-Stark condensation assembly and the last port was used as the sampling port. The reaction mixture was refluxed for 30 minutes. At the end of 30 minutes, 0.04 g of stannous (II) octoate catalyst and 2 g of 3-acryloxypropyldimethylmethoxysilane ("3-Ac") were introduced and the reflux continued for 90 minutes. At the end of 115 minutes, the temperature was reduced to 80° C. and 15 mL of trimethylmethoxysilane was introduced to cap chain ends that were not endcapped by 3-Ac. The endcapping reaction was carried out for 60 minutes. At the end of this reaction, the reaction mixture was poured into 250 mL of ethanol in a 1 L beaker and stirred. The reaction flask was rinsed with 50 mL of heptane and the liquid was added to the 1 L beaker. To this stirred mixture was added 250 mL of methanol and the stirring continued for an additional 10 minutes. The contents of the beaker were then transferred into a 1 L separatory funnel for layer separation. After allowing to stand for about 12 hours, the bottom layer was separated and rotary evaporated to obtain the siloxane segment of the emulsifier for methacrylate segment incorporation.

The yield, after rotary evaporation was 46 g and the obtained polymer had a refractive index of 1.4711. The number average molecular weight, Mn, of the polymer was 29,650 Daltons.

Step 2

Synthesis of the Copolymer Emulsifier

Into a 500 mL, 3-neck flask the following materials were charged:

23 g of the siloxane segment (as prepared above in Step 1), 32.12 g of laurylmethacrylate (LMA), 0.715 g of 2-HEMA and 1.25 g of 1-hexanethiol. Then, to this mixture was added 80 mL of degassed (by nitrogen bubbling) toluene. An appropriate sized magnetic stirring bar was used for stirring the reaction mixture during the entire reaction period. One port of the flask was used for condensing the refluxing solvent, the second port was used for introducing a thermometer for monitoring the reaction temperature and the third port was used for sampling.

Nitrogen was bubbled during the entire course of the reaction. The reaction mixture was heated to 75° C. at which point 0.125 g of 2,2'-azobisisobutyronitrile ("AIBN") initiator in 20 mL of toluene was introduced. The temperature of the reaction was maintained at 80° C. for 20 hours. Then the reaction mixture was refluxed for an additional 2 hours to decompose any unreacted AIBN free radical initiator. The reaction mixture was rotary evaporated to obtain the copolymer. The rotary evaporated copolymer was passed through a short path distillation (spd) unit at 100° C. at 2 mTorr pressure. Yield after spd treatment was 48.01 g. The refractive index of the copolymer was 1.4660. Mp of the methacrylate segment of the copolymer was 5200. The copolymer had an iridescent color.

Example 3

Step 1

Synthesis of the Siloxane Segment

Into a three-neck, 2 L round bottom flask the following materials were charged:

200 g of purified disilanol terminated diphenylsiloxane-dimethylsiloxane and 800 mL of heptane. One port was used for mechanical mixing, the second port was used for setting up the Dean-Stark condensation assembly and the last port was used as the sampling port. The reaction mixture was refluxed for 60 minutes. At the end of 90 minutes, 0.16 g of stannous (II) octoate catalyst and 8 g of 3-acryloxypropyldimethylmethoxysilane ("3-Ac") were introduced and the reflux continued for 105 minutes. At the end of 105 minutes, the temperature was reduced to 60° C. and 15 mL of trimethylmethoxysilane was introduced to cap chain ends that were not endcapped by 3-Ac. The endcapping reaction was done for 60 minutes. At the end of this reaction, the reaction mixture was poured into 1 L of ethanol in a 5 L beaker and stirred. The reaction flask was rinsed with 200 mL of heptane and the liquid was added to the 5 L beaker. To this stirred mixture was added 1 L of methanol and the stirring continued for an additional 10 minutes. The contents of the beaker were then transferred into a 4 L separatory funnel for layer separation. After allowing to stand for about 12 hours, the bottom layer was separated and rotary evaporated to obtain the siloxane segment of the emulsifier for methacrylate segment incorporation.

The yield, after rotary evaporation was 173.3 g and the obtained polymer had a refractive index of 1.4730. The number average molecular weight, Mn, of the polymer was 24,260 Daltons.

Step 2

Synthesis of the Copolymer Emulsifier

Into a 500 mL, 3-neck flask the following materials were charged: 60 g of the siloxane segment (as prepared above in Step 1), 83.75 g of laurylmethacrylate (LMA), 1.87 g of 2-HEMA and 1.56 g of 1-hexanethiol. Then, to this mixture was added 90 mL of degassed (by nitrogen bubbling) toluene. An appropriate sized magnetic stirring bar was used for stirring the reaction mixture during the entire reaction period. One port of the flask was used for condensing the refluxing solvent, the second port was used for introducing a thermometer for monitoring the reaction temperature and the third port was used for sampling.

Nitrogen was bubbled during the entire course of the reaction. The reaction mixture was heated to 75° C. at which point 0.26 g of 2,2'-azobisisobutyronitrile ("AIBN") initiator in 60 mL of toluene was introduced. The temperature of the reaction was maintained at 80° C. for 20 hours. Then the reaction mixture was refluxed for an additional 2 hours to decompose any unreacted AIBN free radical initiator. The reaction mixture was rotary evaporated to obtain the copolymer. The rotary evaporated copolymer was passed through a short path distillation (spd) unit at 100° C. at 2 mTorr pressure. Yield after spd treatment was 137.58 g. The refractive index of the copolymer was 1.4733. Mp of the methacrylate segment of the copolymer was 9200. The copolymer had an iridescent color.

For the type of emulsifier exemplified by the copolymer described in Example 1 hereof, and for other emulsifiers of the present invention, the molecular weight and/or structure of the segments of the emulsifier can be varied so that the emulsifier can be tailored to be (a) soluble only in the liquid matrix polymer and not in the liquid suspending medium; (b) soluble only in the liquid suspending medium and not in the liquid matrix polymer; (c) soluble in both the liquid matrix polymer and liquid suspending medium; and (d) insoluble in both the liquid matrix polymer and the liquid suspending medium when tested with those liquids individually. The emulsifier of (d) above has a segment which is soluble in the liquid matrix polymer and another segment whose structural composition is very similar to the liquid suspending polymer and is therefore expected to be soluble in the liquid suspending medium. Evidence that this is true is confirmed by the experimental data showing that it performs well as an emulsifier.

In Example 1, the emulsifier is of type (b) above. In Example 2, the emulsifier is of type (a) above. Example 3 hereof is of type (d) above. All act satisfactorily as emulsifiers. As mentioned above, type (c) emulsifier can also be synthesized by tailoring the segments molecular weights; because of its extreme solubility, however it is not expected to perform as efficiently as the other three types of emulsifier. The inventors do not wish to be bound by this hypothesis, however.

Using the emulsifier of Example 3, three separate film samples were coated by adding the emulsifier to an emulsion using three different techniques. Otherwise, the film samples were made in an identical manner using the identical materials. In the first sample, the emulsifier was added to the liquid suspension, then homogenized and added to the rest of the emulsion, i.e., liquid matrix polymer, before forming the first film sample. In the second sample, the emulsifier was added to the liquid matrix polymer, then homogenized and added to the remainder of the emulsion, i.e, the liquid suspension, before forming the second film sample. In the third sample, the emulsifier was added to a complete emulsion and then homogenized prior to forming the third film sample. All three film samples were activated with 50 volts AC at a frequency of 400 Hertz. The light transmission ranges and haze values of the three samples were all relatively satisfactory. The best result, however, was obtained with the second sample wherein the emulsifier was added to the liquid matrix polymer first. The resultant film had a light transmission range ($\Delta T$) of 49.70% (changing from a 25.05% dark state to 74.75% activated state) and a low haze value of only 2.6% when the film was activated. The best procedure for adding any given emulsifier may be readily determined empirically by one of ordinary skill in this art.

In Table 1 below are summarized the data corresponding to the emulsifiers synthesized in Examples 1, 2 and 3 respectively.

TABLE 1

Molecular Weight Data of Emulsifiers Referred to in the Synthesis Procedure

| Example Number | Siloxane Segment Mn | Siloxane Segment Mp | Methacrylate Segment Mp |
|---|---|---|---|
| 1 | 20,500 | 22,110 | 9500 |
| 2 | 29,650 | 89,710 | 5200 |
| 3 | 24,260 | 78,900 | 9200 |

Different emulsifiers gave consistently similar results in that the droplets sizes were maintained for longer periods of time compared to the coating made with emulsion that did not contain the emulsifier.

All measurements were made at 65° C. on uncured, 2 mil wet emulsion coatings.

TABLE 2

| Emulsifier Concentration, wt % | Average Droplet Size (Diameter) in μm after | | | |
|---|---|---|---|---|
| | Zero Time | 2 Minutes | 5 Minutes | 30 Minutes |
| 0 | 1-2.5 | 2.5 | 2.5-5.0 | 5.0 |
| 2 | 1-2.5 | 1-2.5 | 1-2.5 | 2.5 |

Optical Properties of Emulsifier-Containing Films

In the table, the term "$T_{off}$" means the light transmission of the SPD film before electrical activation, i.e., in the "off" state. The term "$T_{on}$" means the light transmission of the film when activated electrically, i.e., in the "on" state. The term "$\Delta T$" means the difference in light transmission between the "on" and "off" states.

TABLE 3

| Emulsifier content, wt. % | Elapsed Time, Min. | Elapsed Time, Min. | Droplet Size, Diameter μm | $T_{off}$, % | $T_{on}$, % | $\Delta T$ |
|---|---|---|---|---|---|---|
| 0 | 5 | | 2.5-7.5 | 22.06 | 66.32 | 44.26 |
| | | 10 | 5.0-7.5 | 26.03 | 60.44 | 34.41 |
| 1 | 5 | | 2.5-5.0 | 25.52 | 72.34 | 46.82 |
| | | 10 | 7.5 | 25.08 | 71.88 | 46.80 |
| 2 | 5 | | 2.5 | 18.49 | 69.74 | 51.25 |
| | | 10 | 2.5-5.0 | 26.24 | 72.15 | 45.91 |

Both A-B and A-B-A type block copolymers are within the scope of the present invention. And it is possible to make such block copolymers by "living" anionic polymerization methods well known in the polymer art. Copolymers made by such methods will have compositions that are similar to but not necessarily identical to copolymers made by other preferred methods disclosed herein. For example, in an anionic polymerization process a polymeric methacrylate segment would be made first with one or two "living" chain ends, and then further reacted to open up a cyclic siloxane monomer, e.g., "P4" and/or "D4," materials well known in the art. Under appropriate conditions the reverse order of synthesis is also possible. However, making such copolymers by means of "living" polymerization methods demands extremely rigorous synthesis conditions to eliminate nearly all water and oxygen from the reaction, and therefore such materials are very expensive to manufacture.

The preferred general method for synthesizing the emulsifiers of the present invention, as described herein, is to first make the siloxane polymeric segment by condensation polymerization and to end cap one or both ends of such chains with a (meth)acrylate-containing monomer, and thereafter further polymerize thereon with either a methacrylate-containing monomer or a methacrylate-containing monomer and one or more additional monomers such as 2-HEMA. This preferred method of emulsifier synthesis does not require especially rigorous reaction conditions and therefore the cost of emulsifiers made in this manner is far less than emulsifiers made by anionic polymerization.

For use in an emulsifier herein, methacrylate monomers are preferred over acrylate monomers because of their greater stability with respect to ultraviolet radiation; however, acrylate monomers can be used instead if it is less costly or more convenient. Thus, whenever a methacrylate monomer is mentioned in an example herein, one may generally substitute an analogous acrylate monomer and be within the scope of the present invention.

Also, although lauryl methacrylate is a preferred type of ester monomer, any other monomer with appropriate solubility and immiscibility characteristics, as explained above, may be used instead. Non-limiting examples of alternative ester monomers include n-octyl methacrylate and n-hexyl methacrylate. Moreover, the weight percent of phenyl and/or methyl groups in the siloxane segment of the emulsifier can also be varied as long as the aforesaid solubility, immiscibility and refractive index requirements are met.

What is claimed is:

1. A film for use in a suspended particle device (SPD), said film comprised of a cross-linked matrix polymer having a plurality of droplets of a liquid light valve suspension distributed therein, said film being formed with the use of an emulsifier, said emulsifier being a separate non-crosslinkable emulsifier formed of a copolymer material comprising at least first and second segments, said segments differing from one another in at least one of their chemical affinities, their compositions and their polarities, wherein a first one of said segments is soluble in an uncured liquid matrix polymer used in forming the film, but insoluble in a liquid suspension medium in which said droplets are dispersed, and a second one of said segments is soluble in the liquid suspending medium of the droplets and insoluble in the uncured liquid matrix polymer, wherein the first and second segments have substantially the same index of refraction in the range of 1.4630 to 1.4800 and wherein the index of refraction of said segments is within 0.010 of that of each phase of an emulsion formed with said emulsifier, said first segment comprised of a material selected from the group consisting of linear organosiloxanes, branched organosiloxanes, linear alkyl groups, branched alkyl groups, linear fluoroalkyl groups and branched fluoroalkyl groups and said second segment comprised of a material selected from the group consisting of linear esters, branched esters, linear (meth)acrylate, branched (meth)acrylate, linear amide, branched amide, linear amine, branched amine, linear epoxy groups, branched epoxy groups, linear groups comprising hydroxyl or acid groups and branched groups comprising hydroxyl or acid groups, wherein one segment of the emulsifier copolymer is comprised of a polyorganosiloxane polymer having pendant phenyl groups and the weight percent of the polyorganosiloxane in the emulsifier ranges from about 35% to about 65% by weight, wherein said emulsifier substantially prevents coalescence of the droplets of the liquid light valve suspension during formation of said film by retarding growth of said droplets.

2. The film according to claim 1, wherein the emulsifier as a whole is substantially soluble in the uncured liquid matrix polymer upon being mixed together with said uncured liquid matrix polymer and substantially insoluble in the liquid suspension medium upon being mixed together with said liquid suspension medium.

3. The film according to claim 1, wherein the emulsifier as a whole is substantially soluble in the liquid suspension medium upon being mixed together with said liquid suspension medium and substantially insoluble in the uncured liquid matrix polymer upon being mixed together with said uncured liquid matrix polymer.

4. The film according to claim 1, wherein the emulsifier as a whole is substantially soluble in the uncured liquid matrix polymer upon being mixed together with the uncured liquid matrix polymer and is also substantially soluble in the liquid suspension medium upon being mixed together with the liquid suspension medium.

5. The film according to claim 1, wherein the emulsifier as a whole is substantially insoluble in the uncured liquid matrix polymer upon being mixed together with the uncured liquid matrix polymer and is also substantially insoluble in the liquid suspension medium upon being mixed together with the liquid suspension medium.

6. The film of claim 1 wherein said first segment is of low polarity relative to said second segment, and said second segment is relatively polar relative to said first segment.

7. The film of claim 1 wherein the index of refraction of said first and said second segments is within 0.005 of that of each phase of an emulsion formed with said emulsifier.

8. The film of claim 7, wherein the index of refraction of each segment is within 0.002 of that of each phase of the emulsion formed with said emulsifier.

9. The film according to claim 1 wherein said separate emulsifier is represented by Formula I below:

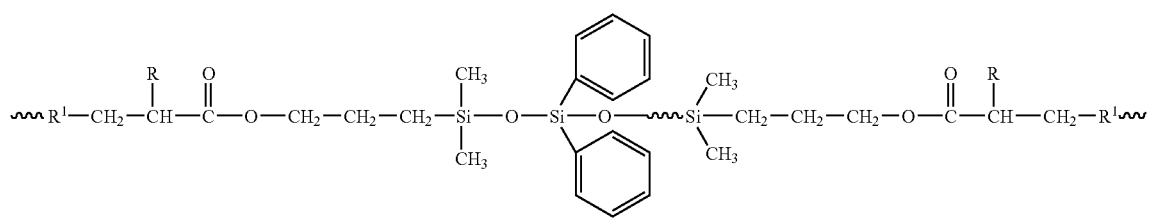

where R represents an initiator moiety,

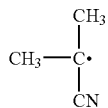

and R¹ represents an alkyl(meth)acrylate polymeric segment, and

represents a phenyl group.

10. The film of claim 9, wherein the alkyl (meth)acrylate polymeric segment comprises a (lauryl methacrylate-co-HEMA) polymer.

11. The film of claim 1 wherein one segment of the emulsifier copolymer is comprised of (meth)acrylates that are soluble in poly(lauryl methacrylate), said (meth)acrylates having a molecular weight of 1500-6000 Daltons and a refractive index such that the emulsifier has a Refractive Index of 1.4730 plus or minus 0.005.

12. The film of claim 11, wherein the (meth)acrylate segment of the emulsifier is present in said emulsifier in an amount of between about 35-65 weight percent.

13. The film of claim 11, wherein the (meth)acrylate segment is comprised of a material selected from the group consisting of a homopolymer of $C_6$ or higher alkyl(meth) acrylates and a copolymer with 2-hydroxyethylmethacrylate.

14. A method of improving stability of an emulsion used in making a film for use in a suspended particle device, which method comprises forming said film with a separate an emulsifier according to claim 1.

15. A method of reducing coalescence of drops of a liquid suspension medium in an emulsion used in forming a film for use in a suspended particle device, which method comprises forming said film with a separate emulsifier according to claim 1.

16. A method for improving performance characteristics of a film for use in a suspended particle device, which method comprises forming said film with a separate emulsifier according to claim 1.

* * * * *